(12) United States Patent
Knoedgen et al.

(10) Patent No.: US 9,414,468 B2
(45) Date of Patent: Aug. 9, 2016

(54) MAGNETIC COIL / TRANSFORMER MODULATION

(71) Applicant: Dialog Semiconductor GmbH, Kirchheim/Teck-Nabern (DE)

(72) Inventors: Horst Knoedgen, Munich (DE); Julian Tyrrell, Swindon (GB)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 336 days.

(21) Appl. No.: 14/132,393

(22) Filed: Dec. 18, 2013

(65) Prior Publication Data
US 2014/0285092 A1    Sep. 25, 2014

(30) Foreign Application Priority Data

Mar. 25, 2013 (EP) ..................... 13160815

(51) Int. Cl.
*H05B 37/02* (2006.01)
*H04B 5/00* (2006.01)
*H05B 33/08* (2006.01)

(52) U.S. Cl.
CPC .......... *H05B 37/0272* (2013.01); *H04B 5/0025* (2013.01); *H05B 33/0815* (2013.01); *H05B 33/0851* (2013.01); *H05B 37/0245* (2013.01);
(Continued)

(58) Field of Classification Search
CPC ............... H05B 33/08; H05B 33/0815; H05B 33/0845; H05B 33/0851; H05B 37/0272; H04B 5/0025
USPC ................... 315/151, 223, 307, 192
See application file for complete search history.

(56) References Cited

U.S. PATENT DOCUMENTS

| 2005/0213353 A1 | 9/2005 | Lys |
| 2008/0290738 A1 | 11/2008 | Greene et al. |
| 2011/0109228 A1 | 5/2011 | Shimomura et al. |

(Continued)

FOREIGN PATENT DOCUMENTS

| AT | WO 2011116404 A1 * | 9/2011 | ......... H05B 33/0815 |
| CN | 101469813 | 7/2009 | |

(Continued)

OTHER PUBLICATIONS

European Search Report 13160815.0-1802 Mailed : Feb. 7, 2014, Dialog Semiconductor GmbH.

(Continued)

*Primary Examiner* — Lincoln Donovan
*Assistant Examiner* — Thomas Skibinski
(74) *Attorney, Agent, or Firm* — Saile Ackerman LLC; Stephen B. Ackerman

(57) ABSTRACT

A communication system with SSL light bulb assemblies comprises a first and a second transceiver. The first transceiver comprises a magnet, and the second transceiver comprises a switched-mode power converter which comprises an inductor element with an inductor core material having a magnetic field dependent permeability. The magnet and the inductor core material of the inductor element are magnetically coupled. The first transceiver is configured to modulate a magnetic field generated by the magnet to generate a modulated downstream magnetic field indicative of downstream data, and the second transceiver is configured to extract the downstream data from a measurement signal from the power converter. The measurement signal is dependent on an inductor value of the inductor element.

26 Claims, 10 Drawing Sheets

(52) U.S. Cl.
CPC ......... *H05B 33/0809* (2013.01); *H05B 33/0842* (2013.01)

(56) References Cited

U.S. PATENT DOCUMENTS

| | | | |
|---|---|---|---|
| 2014/0167631 A1* | 6/2014 | Knoedgen | H05B 33/0848 315/192 |
| 2015/0244248 A1* | 8/2015 | Knoedgen | H05B 33/0815 315/223 |
| 2015/0296574 A1* | 10/2015 | Knoedgen | H05B 33/08 315/307 |

FOREIGN PATENT DOCUMENTS

| | | |
|---|---|---|
| CN | 101959346 | 1/2011 |
| WO | WO 2011 056242 | 5/2011 |
| WO | WO 2011056242 | 5/2011 |
| WO | WO 2011 116404 | 9/2011 |
| WO | WO 2011116404 | 9/2011 |

OTHER PUBLICATIONS

Chinese Office Action and English Translation 201410053380.5, Nov. 11, 2015, Dialog Semiconductor GmbH.

* cited by examiner

_US 9,414,468 B2_

MAGNETIC COIL / TRANSFORMER MODULATION

TECHNICAL FIELD

The present document relates to Solid State Lighting (SSL) light bulb assemblies. In particular, the present document relates to the communication with such SSL light bulb assemblies.

BACKGROUND

An SSL light bulb assembly typically comprises a driver circuit configured to convert a mains voltage into a drive voltage for the SSL device comprised within the SSL light bulb assembly. During the manufacturing process it may be beneficial to calibrate the electronics of the SSL light bulb assembly (notably the driver circuit) in order to improve the performance of the SSL light bulb assembly and/or in order to improve the manufacturing yield. Also the communication can be used to configure the SSL driver circuitry and operating mode.

The calibration of the SSL light bulb assembly may require communication means from an external calibration unit to the SSL light bulb assembly which is to be calibrated. By way of example, during the calibration process different settings for the driver circuit may need to be communicated from the calibration unit to the SSL light bulb assembly. In view of the overall cost of the SSL light bulb assembly, these communication means should not require any additional hardware. Furthermore, it should be possible to rapidly set up the communication link from the calibration unit to the SSL light bulb assembly, in order to shorten the length (any by consequence the cost) of the calibration process.

The present document addresses the above mentioned technical problems. In particular, the present document describes a method and a system which enable the communication from a calibration unit to a SSL light bulb assembly. In more generic terms, the method and system enable the communication with a power converter comprised e.g. with a SSL light bulb assembly.

SUMMARY

A principal object of the present disclosure is to establish communication with SSL light bulb assemblies.

A further object of the disclosure is to calibrate the electronics of the SSL light bulb assembly, notably the driver circuit, in order to improve the performance of the SSL light bulb assembly and/or in order to improve the manufacturing yield.

A further object of the disclosure is to establish a communication means from an external calibration unit to the SSL light bulb assembly which is to be calibrated wherein the communication means should not require any additional hardware . . . .

A further object of the disclosure is to enable a rapid set-up of a communication link from the calibration unit to the SSL light bulb assembly in order to shorten the length and the cost of the calibration process.

A further object of the disclosure is to enable the communication link from the calibration unit to the SSL light bulb assembly with a power converter comprised with the SSL light bulb assembly . . . .

In accordance with the objects of this disclosure a communication system has been achieved. The communication system disclosed comprises: a first transceiver comprising a magnet and a second transceiver comprising a switched-mode power converter which comprises an inductor element with an inductor core material having a magnetic field dependent permeability; wherein the magnet and the inductor core material of the inductor element are magnetically coupled, wherein the first transceiver is configured to modulate a magnetic field generated by the magnet, to generate a modulated downstream magnetic field indicative of downstream data, and wherein the second transceiver is configured to extract the downstream data from a measurement signal from the power converter; wherein the measurement signal is dependent on an inductor value of the inductor element, and/or the second transceiver is configured to modulate a magnetic field generated by the inductor element, to generate a modulated upstream magnetic field indicative of upstream data, and wherein the first transceiver is configured to extract the upstream data from the modulated upstream magnetic field.

In accordance with the objects of this disclosure a controller for a switched-mode power converter; wherein the switched-mode power converter comprises an inductor element with an inductor core material having a magnetic field dependent permeability has been achieved, wherein the controller disclosed is configured to receive a measurement signal from the power converter; wherein the measurement signal is dependent on an inductor value of the inductor element; wherein the inductor value has been modulated to be indicative of downstream data and to extract the downstream data from the measurement signal.

In accordance with the objects of this disclosure a method for exchanging data between a first transceiver comprising a magnet and a second transceiver comprising a switched-mode power converter which comprises an inductor element with an inductor core material having a magnetic field dependent permeability has been achieved. The method disclosed comprises: providing a magnetic coupling between the magnet and the inductor core material of the inductor element, modulating a magnetic field at one of the first and second transceivers, to generate a modulated magnetic field indicative of data, and extracting the data from a measurement signal at the respective other one of the first and second transceivers; wherein the measurement signal is dependent on the modulated magnetic field.

In accordance with the objects of this disclosure a method for calibrating a light bulb assembly has been achieved. The method disclosed firstly comprises the steps of: (1) providing a sensor unit, a programming unit, an electromagnet, and a light bulb assembly comprising a light source, a driver unit comprising a controller, (2) providing initial electricity supply to the light bulb assembly in accordance with a default setting, and (3) sensing light output signal of the light bulb assembly by the sensor unit. Furthermore the method comprises (4) returning sensor signal to the programming unit, (5) processing sensor signal by the programming unit to produce control data to be transmitted to the controller, and (6) generating a modulated electrical signal based upon the control data. Moreover the method comprises (7) supplying the modulated electrical signal to the light bulb assembly via the electromagnet, (8) generating an output light signal by the light source controlled by the controller in dependence upon the control data, and (9) going back to step (3) if the sensor signal is not within a predetermined range of values else go to end of calibration.

In accordance with the objects of this disclosure a method for exchanging data between a first transceiver and a second transceiver has been achieved. The method disclosed comprises the steps of: providing a communication system for exchanging data between a first transceiver comprising a magnet and a second transceiver comprising a switched-mode power converter comprising an inductor element, providing a magnetic coupling between the magnet and the inductor core material of the inductor element, modulating the magnetic field at one of the first and second transceivers to generate a modulated magnetic field indicative of data, and extracting the data from a measurement signal at the respective other one of the first and second transceivers wherein the measurement signal is dependent on the modulated magnetic field.

According to an aspect, a communication system comprising a first and a second transceiver is described. The first transceiver may comprise a magnet, e.g. an electro-magnet. The electro-magnet may comprise a magnet core material and a coil. The coil may surround the magnet core material, thereby inducing a magnetic field within the magnet core material, when a coil current is flowing through the coil. The magnet core material may be a ferrite material (such as iron).

The second transceiver may comprise a switched-mode power converter, such as a buck converter, a flyback converter, a boost converter, a buck-boost converter, and/or a SEPIC converter. The power converter comprises an inductor element with an inductor core material having a magnetic field dependent permeability (e.g. a ferrite material). The inductor element may comprise one or more coils. By way of example, the inductor element may comprise a transformer. Furthermore, the power converter may comprise a power switch (e.g. a transistor). The power switch may be controlled to commutate between an on-state and an off-state at a commutation cycle rate (also referred to as the switching frequency of the power switch). Typical commutation cycle rates are in the range of 100 kHz. The power converter may be arranged such that during the on-state of the power switch, a current may flow through a first coil of the inductor element, and such that during an off-state of the power switch the current through the first coil of the inductor element is interrupted.

The magnet, in particular the magnet core material, and the inductor core material of the inductor element may be magnetically coupled. The strength of the magnetic field generated by the magnet and/or by the inductor element may depend on the coupling strength between the magnet and the inductor element.

The first transceiver may be configured to modulate a magnetic field generated by the magnet. This may be achieved e.g. by modulating the coil current of an electro-magnet. Alternatively or in addition a permanent magnet may be used. The modulation of the magnetic field may be performed by turning/moving the permanent magnet with respect to the inductor core material (e.g. by changing the north/south direction with respect to the inductor core material and/or by changing the distance from the inductor coil material). A further possibility for modulating the magnetic field provided by the magnet is to modify a shielding of the magnetic field (e.g. using a metallic shield). The shield may be inserted and/or removed to modulate the magnetic field, As such; there are various means for modulating the magnetic field provided by the magnet. These means may be combined in different ways.

The magnetic field may be amplitude and/or frequency modulated. As such, the magnet may be configured to generate a modulated downstream magnetic field indicative of downstream data. By way of example, the magnetic field may take on first amplitude and second amplitude. The first amplitude may be associated with a bit value "1" and the second amplitude may be associated with a bit value "0". The amplitude of the magnetic field may be modified at a pre-determined baud-rate (or symbol-rate). The symbol rate may e.g. correspond to the commutation cycle rate of the power switch of the power converter. As such, the modulated magnetic field may be used to transmit one bit of data within each symbol, thereby providing a bit-rate which corresponds to the symbol-rate. It should be noted that higher bit-rates may be achieved by using a higher number of amplitudes and/or by using other modulation schemes, such as frequency modulation.

The second transceiver may be configured to extract the downstream data from a measurement signal from the power converter. The measurement signal may be derived from a current or a voltage at one of the components of the power converter. The measurement signal may be dependent on an inductor value of the inductor element. In particular, the measurement signal may be indicative of a current through a power switch of the power converter. Alternatively or in addition, the measurement signal may be indicative of a current through the first coil of the inductor element. Alternatively or in addition, the measurement signal may be indicative of free-wheeling of an auxiliary coil of the inductor element.

The peak current and/or the slew rate of the current through the power switch and/or through the first coil of the inductor element may be indicative of the inductor value of the inductor element. Due to the inductor core material having a magnetic field dependent permeability, the inductor value depends on the strength of the magnetic field. As such, the modulated downstream magnetic field translates into a corresponding modulated inductor value. The modulated inductor value leads to a modified peak current and/or to a modified slew rate of the current, thereby enabling the second transceiver to extract the downstream data from the measurement signal.

In a similar manner, the modulated inductor value affects a time interval of free-wheeling of an auxiliary coil of the inductor element. As such, the variations of the time interval of free-wheeling may enable the second transceiver to extract the downstream data from the measurement signal.

The second transceiver may comprise a controller configured to control the power converter. In particular, the controller may be configured to generate a control signal for the power switch of the power converter. The control signal may be provided to (a gate of) the power switch via a control pin of the controller. Subject to the control signal, the power switch may commutate between its on-state and its off-state at the commutation cycle rate and at a duty cycle. Furthermore, the controller may be configured to receive the measurement signal via a sensing pin of the controller. As such, the controller may be configured to extract the downstream data based on the measurement signal. The controller may be implemented as an integrated circuit (IC).

Overall, the commutation system allows downstream data to be transmitted in a wireless manner from an external transmitter to (the controller of) a switched-mode power converter. This may be beneficial in order to be able to control the operational state of the power converter from the external transmitter. As such, the downstream data may comprise data for modifying an operating mode of the power converter. This may be useful in order to calibrate the operating mode of the power converter. In particular, a light bulb assembly comprising the power converter may be calibrated using the communication system described in the present document.

Alternatively or in addition, the second transceiver may be configured to modulate a magnetic field generated by the inductor element, to generate a modulated upstream magnetic field indicative of upstream data. Furthermore, the first transceiver may be configured to extract the upstream data from the modulated upstream magnetic field. In particular, the first transceiver may be configured to extract the upstream data from the coil current of the electro-magnet, which is modulated in accordance to the modulated upstream magnetic field. As such, the communication system may be used to enable an upstream communication path from the (controller of) the power converter to an external receiver.

As already indicated above, the downstream and/or upstream magnetic fields may be amplitude modulated and/or frequency modulated. In other words, amplitude of the magnetic field may be modulated, and/or a frequency of a modification of the magnetic field may be modulated. In particular, the modulated downstream magnetic field may comprise a high state, subject to which the inductor core material of the inductor element is saturated. Furthermore, the modulated downstream magnetic field may comprise a low state, subject to which the inductor core material of the inductor element remains un-saturated. As such, the inductor core material may be changed at the baud-rate between saturation and non-saturation. The saturation of the inductor core material typically leads to a decrease of the inductor value of the inductor element. The use of magnetic fields which put the inductor core material into saturation is beneficial, as it makes the magnetic coupling between the magnet and the inductor element independent of the relative orientation of the magnet with respect to the inductor element. This simplifies the setup of the communication link between the first and second transducers.

The frequency of the modifications of the magnetic field may be higher than the commutation cycle rate of the power switch of the power converter. By doing this, the inductor value of the inductor element may be modified various times during the on-state of the power switch. These modifications of the inductor value during the on-state of the power switch may be detected via the measurement signal (e.g. via the current through the first coil of inductor element). In particular, the modifications of the inductor value during the on-state of the power switch may have an impact on the slew rate of the current through the first coil of the inductor element. The different slew rates may be detected by the second transceiver.

According to another aspect, a controller for a switched-mode power converter is described. The switched-mode power converter may comprise an inductor element with an inductor core material having a magnetic field dependent permeability. The controller may be configured to receive a measurement signal from the power converter. As outlined above, the measurement signal may be dependent on an inductor value of the inductor element. The inductor value may have been modulated to be indicative of downstream data (e.g. using a modulated downstream magnetic field generated by an external magnet). The controller may be configured to extract the downstream data from the measurement signal.

According to an aspect, a driver circuit or a power supply, e.g. for a light bulb assembly, is described. The driver circuit is configured to provide, at an output of the driver circuit, electrical energy at a drive voltage. The drive voltage may correspond to the on-voltage of a light source (e.g. an SSL based light source) of the light bulb assembly. The electrical energy at the drive voltage may be derived from electrical energy at an input voltage at an input of the driver circuit. The electrical energy at the input voltage may correspond to the electrical energy provided by a mains supply. In particular, the input voltage may correspond to a rectified mains voltage.

The driver circuit may comprise a power converter configured to convert the electrical energy at the input voltage into the electrical energy at the drive voltage. By way of example, the power converter may comprise a switched-mode power converter, such as a boost converter, a buck converter, a buck-boost converter, a flyback converter and/or a SEPIC (Single-ended primary-inductor converter) converter. The power converter may comprise a power switch (e.g. a transistor such as a metal oxide semiconductor field effect transistor). Furthermore, the power converter may comprise an inductor element with an inductor core material having a magnetic field dependent permeability.

Furthermore, the driver circuit may comprise a controller (which is e.g. implemented as an integrated circuit). The controller may be configured to control the power converter (e.g. the power switch of the power converter) such that the power converter provides the electrical energy at the drive voltage. The controller may comprise any of the features described in the present document.

According to a further aspect, a light bulb assembly is described. The light bulb assembly may comprise an electrical connection module configured to electrically connect to a mains power supply, thereby providing electrical energy at the input voltage. Furthermore, the light bulb assembly may comprise a driver circuit as described in the present document. The driver circuit may be configured to provide electrical energy at the drive voltage derived from the electrical energy at the input voltage. Furthermore, the light bulb assembly comprises a light source (e.g. a series of LEDs or OLEDs) configured to provide light using the electrical energy at the drive voltage.

According to another aspect, a method for exchanging data between a first and a second transceiver is described. The first transceiver comprises a magnet and the second transceiver comprises a switched-mode power converter which comprises an inductor element with an inductor core material having a magnetic field dependent permeability. The method may comprise providing a magnetic coupling between the magnet and the inductor core material of the inductor element. Furthermore, the method may comprise modulating a magnetic field (e.g. the downstream magnetic field and/or the upstream magnetic field) at one of the first and second transceivers, to generate a modulated magnetic field indicative of data (e.g. the downstream data and/or the upstream data). Furthermore, the method may comprise extracting the data from a measurement signal (e.g. the current through the inductor element at the second transceiver and/or the coil current at the magnet) at the respective other one of the first and second transceivers. The measurement signal is dependent on the modulated magnetic field.

According to a further aspect, a calibration system configured to calibrate a light bulb assembly is described. The light bulb assembly may comprise any of the features described in the present document. The calibration system may comprise a magnet (e.g. an electro-magnet) configured to generate a magnetic field. The magnet may be arranged to be magnetically coupled with the inductor element comprised within the light bulb assembly (in particular, with the inductor element of the power converter comprised within the light bulb assembly).

The calibration system may further comprise a programming unit configured to determine control data for modifying an operating state of a controller comprised within the light bulb assembly. The controller of the light bulb assembly may comprise any of the controller-related features described in the present document. Furthermore, the programming unit may be configured to cause the magnet to generate a modulated magnetic field indicative of the control data (e.g. by modulating the coil current of an electro-magnet).

Furthermore, the calibration unit may comprise a sensor unit (e.g. a light sensor) configured to capture light emitted by the light bulb assembly. The programming unit may be configured to determine the control data based on the captured light. In particular, the programming unit may be configured to adjust the operating state in an iterative manner, until a target illumination state (e.g. with respect to intensity and/or spectrum) of the light bulb assembly has been reached.

According to a further aspect, a method for calibrating a light bulb assembly is described. The method may comprise establishing a communication path from a magnet to an inductor element comprised within the light bulb assembly, by magnetically coupling the magnet and the inductor element. Furthermore, the method may comprise determining control data for modifying an operating state of a controller comprised within the light bulb assembly. The method may proceed in causing the magnet to generate a modulated magnetic field indicative of the control data. Furthermore, the method may comprise capturing light emitted by the light bulb assembly. The control data may be determined based on the captured light (thereby closing a feedback loop).

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

In the present document, a light bulb "assembly" includes all of the components required to replace a traditional incandescent filament-based light bulb, notably light bulbs for connection to the standard electricity supply. In British English (and in the present document), this electricity supply is referred to as "mains" electricity, whilst in US English, this supply is typically referred to as power line. Other terms include AC power, line power, domestic power and grid power. It is to be understood that these terms are readily interchangeable, and carry the same meaning.

Typically, in Europe electricity is supplied at 230-240 VAC, at 50 Hz (mains frequency) and in North America at 110-120 VAC at 60 Hz (mains frequency). The principles set out in the present document apply to any suitable electricity supply, including the mains/power line mentioned, and a DC power supply, and a rectified AC power supply.

Figure 1:
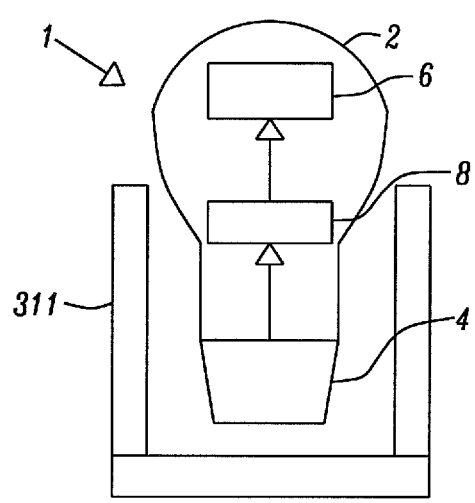
FIG. 1 illustrates a block diagram of an example light bulb assembly.

FIG. 1 is a schematic view of a light bulb assembly. The assembly 1 comprises a bulb housing 2 and an electrical connection module 4. The electrical connection module 4 can be of a screw type or of a bayonet type, or of any other suitable connection to a light bulb socket. Typical examples for an electrical connection module 4 are the E11, E14 and E27 screw types of Europe and the E12, E17 and E26 screw types of North America. Furthermore, a light source 6 (also referred to as an illuminant) is provided within the housing 2. Examples for such light sources 6 are a CFL tube or a solid state light source 6, such as a light emitting diode (LED) or an organic light emitting diode (OLED) (the latter technology is referred to as solid state lighting, SSL). The light source 6 may be provided by a single light emitting diode, or by a plurality of LEDs.

Driver circuit 8 is located within the bulb housing 2, and serves to convert supply electricity received through the electrical connection module 4 into a controlled drive current for the light source 6. In the case of a solid state light source 6, the driver circuit 8 is configured to provide a controlled direct drive current to the light source 6.

The housing 2 provides a suitably robust enclosure for the light source and drive components, and includes optical elements that may be required for providing the desired output light from the assembly. The housing 2 may also provide a heat-sink capability, since management of the temperature of the light source may be important in maximising light output and light source life. Accordingly, the housing is typically designed to enable heat generated by the light source to be conducted away from the light source, and out of the assembly as a whole.

The driver circuit 8 of a light bulb assembly 1 should be configured to provide a drive current to the light source 6 almost instantaneously, subsequent to turning on of the mains supply (e.g. subsequent to a user switching on the light). Consequently, the driver circuit 8 should exhibit a low start-up time. On the other hand, the driver circuit 8 should be configured to measure the duration of short interruptions of the mains supply which may be used to control the behaviour of the light bulb assembly 1. By way of example, intentional interruptions of the mains supply may enable a user to control the dimming of the light bulb assembly 1 using an on/off light switch. The driver circuit 8 should be configured to determine the duration of such interruptions without impacting the start-up time of the driver circuit 8.

In the following, an example driver circuit 8 for a light bulb assembly 1 is described in more detail. In particular, a driver circuit 8 is described which may be used to control the dimming level of the light source 6 of the light bulb assembly 1, subject to intentional interruptions of the mains supply.

Figure 2:
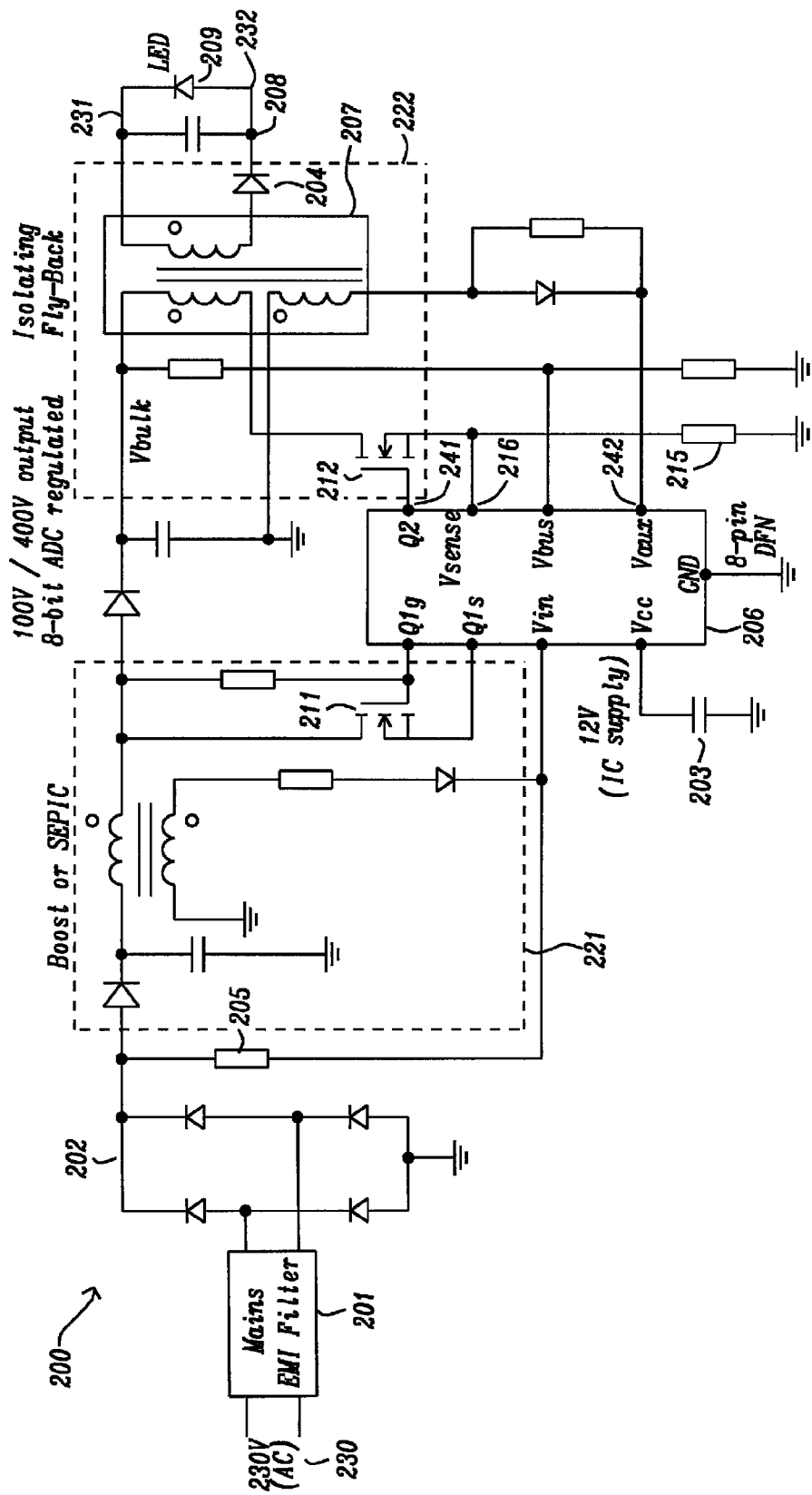
FIG. 2 shows a circuit diagram of an example driver circuit.

FIG. 2 illustrates a circuit diagram of an example driver circuit 200, 8 of a light bulb assembly 1. The driver circuit 200 comprises an electromagnetic interference (EMI) filter unit 201 and a rectifier 202, in order to generate a rectified voltage from the main supply 230. Furthermore, the driver circuit 200 comprises a controller 206 which is configured to control one or more power switches 211, 212 of one or more switched-mode power converters 221, 222. The current through a power switch 212 may be sensed at a pin 216 of the controller 206 using a shunt resistor 215. As such, the shunt resistor 215 may be viewed as current sensing means for sensing the current through the power switch 212. The controller 206 may use the sensed current through the power switch 212 for controlling the switching time instants of the power switch 212.

The controller 206 may be started using the start-up resistor 205. The start-up resistor 205 may be coupled via an internal connection within the controller 206 to the supply voltage capacitor 203 of the controller 206, thereby enabling the charging of the supply voltage capacitor 203. Once the supply voltage capacitor 203 has reached a sufficient charging level, the controller 206 can start operation. The charge of the supply voltage capacitor 203 may be used to maintain the supply voltage for the controller 206 at a pre-determined level, and to bridge brief interruptions of the mains supply. The duration of the interruptions which may be bridged depend on the capacitance of the supply voltage capacitor 203. If the charge of the supply voltage capacitor 203 drops below a pre-determined level, i.e. if the voltage drop at the supply voltage capacitor 203 drops below a pre-determined voltage level (e.g. due to an interruption of the mains supply), the controller 203 stops operation.

In the illustrated example, the driver circuit 200 comprises a two-stage power converter 221, 222 with the first stage 221 being a Boost converter and the second stage 222 being a flyback converter. The flyback converter comprises a transformer 207 having a primary winding, a secondary winding and an additional auxiliary winding 213. The auxiliary winding 213 may be used to provide information to the controller 206 regarding the output voltage 231 (also referred to as the drive voltage) of the driver circuit 200. Furthermore, the driver circuit 200 comprises an output capacitor (or storage capacitor) 208 which stores electrical energy to be provided to the light source 6, 209. The driver circuit 200 is configured to provide the light source 209 with the drive voltage 231 (which corresponds e.g. to the on-voltage of an LED device) and with a drive current 232 (which may be controlled in order to control the illumination level of the light source 209).

As outlined in the background section, it may be beneficial (e.g. for calibration purposes) to provide a communication link to the driver circuit 200, 8 of a light bulb assembly 1. In particular, it may be beneficial to provide data (e.g. instructions or settings) to the controller 206 of the driver circuit 200. A possible way to communicate with the driver circuit 200 may be via modulation of the input mains voltage 230. Such modulations of the input mains voltage 230 may be measureable at the controller 206. However, the modulation of the input mains voltage 230 only allows for relatively low data-rates (due to the relatively low carrier frequency (50 Hz/60 Hz) of the input mains voltage 230). Low data-rates lead to relatively slow calibration processes, thereby increasing the manufacturing costs of a light bulb assembly 1.

In the present document, a non-contact communication system and method to a light bulb assembly 1 are described. The system and method described in the present document allow for increased data-rates. Hence, the system and method may be used for implementing a fast (and cost efficient) calibration process. Furthermore, the method and system may be used to test the saturation limit of the inductor elements 207 (e.g. a transformer and/or an inductor) comprised within the light bulb assembly 1.

It is desirable to communicate data to the light bulb assembly 1 at high data-rates without the need for additional hardware for the communication link. As outlined above, typical light bulb assemblies 1 comprise driver circuits 200 to convert the mains voltage 230 into a drive voltage 231 for the SSL device 209. The driver circuit 200 of a light bulb assembly 1 typically comprises an inductor element 207. For information, it should be noted that light bulb assemblies 1 which only comprise resistive elements (and not inductor element) to control the current 232 through the SSL device 209 are typically not electrically adjustable within a calibration process.

Typically, light bulb assemblies 1 which comprise a DC-DC converter 222 operate at a fixed condition, e.g. a fixed commutation cycle rate and/or a fixed duty cycle of the power switch 212, once the initial start-up phase of the driver circuit 200 has been settled. For a fixed drive current 232 through the SSL device 209, the peak current through the power switch 212 typically depends on the inductor value of the inductor elements 207 comprised within the driver circuit 200 (in particular, comprised within the DC-DC converter 222). The current through the power switch 212 of the power converter 222 may be measured at the sensing pin 216 of the controller 206 of the driver circuit 200. In particular, the voltage drop at the shunt resistor 215 may be measured at the sensing pin 216 of the controller 206.

Figure 4E:
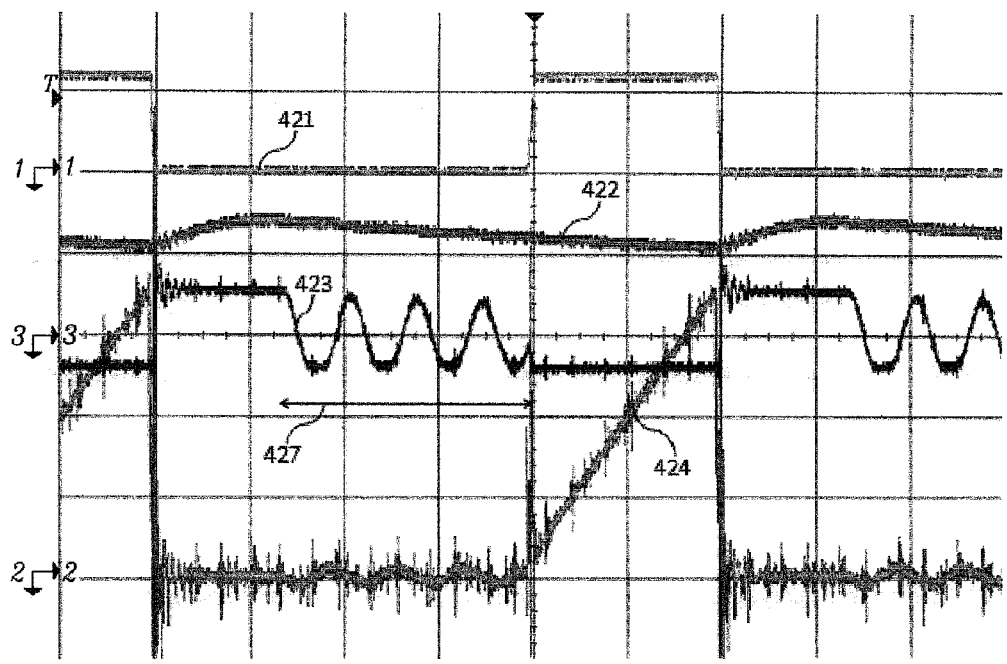
Figure 4F:
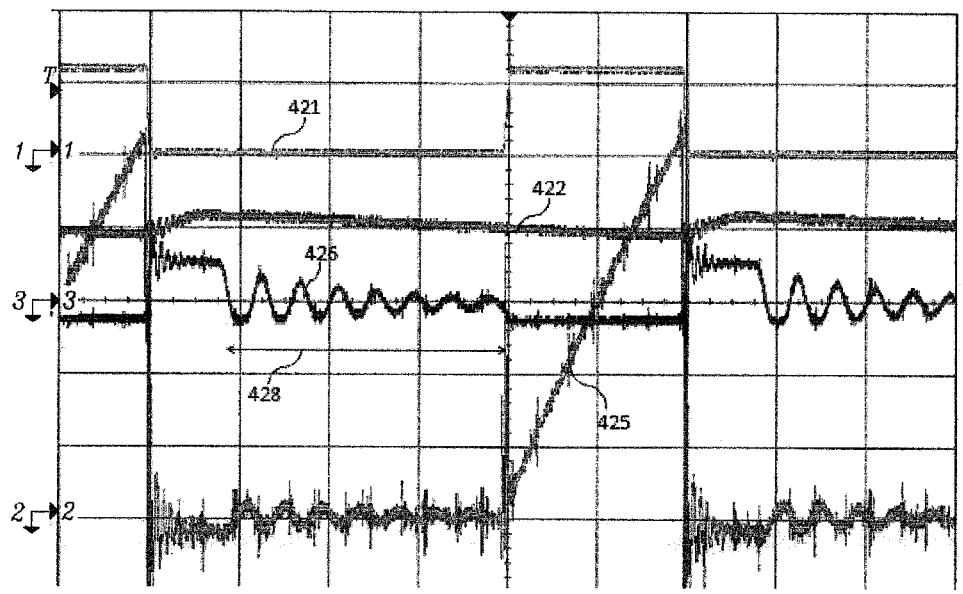
Figure 5A:
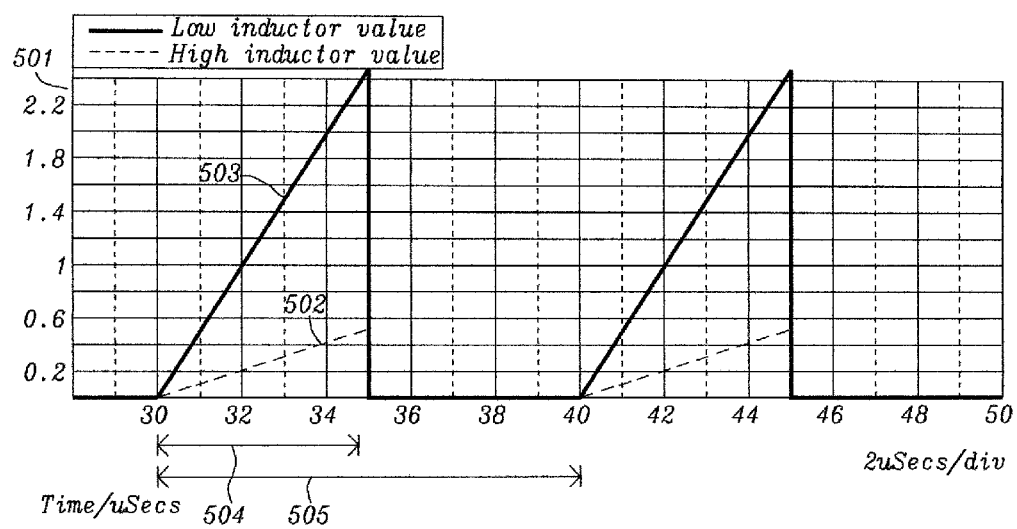
FIGS. 5a to 5c illustrate example impacts of the modulation of the inductor value of an inductor element.

FIG. 5a shows the sensed voltage 501 at the sensing pin 216 as a function of time for different inductor values. It can be seen that for a relatively low inductor value (reference numeral 502); the sensed voltage 501 is lower than for a relatively high inductor value (reference numeral 503). The different sensed voltages 501 (i.e. the different peak currents through the power switch 212) typically do not affect the drive current 232 provided to the SSL device 209 (as shown below in the context of FIGS. 4e and 4f). In other words, the modification of the inductor value impacts the sensed voltage 501; the modification of the inductor value does not, however, impact the drive current 232 provided to the SSL device 209. As indicated above, the drive current 232 provided to the SSL device 209 is typically controlled by the duty cycle of the power switch 212 (i.e. the ratio between on-time 504 of the power switch 212 and length 505 of a commutation cycle).

Figure 5B:
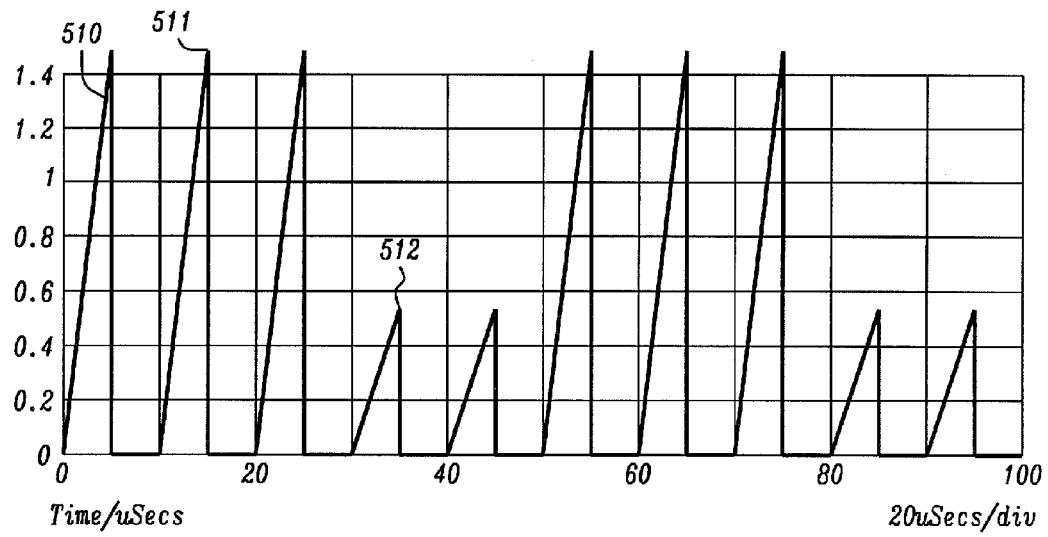

In the present document, it is proposed to modulate the inductor value of one or more inductor elements 207 comprised within a power converter 222. In particular, an electro-magnet may be used to change the characteristics of the one or more inductor elements 207 via a magnetic field generated by the electro-magnet. The change in characteristics of the one or more inductor elements 207 leads to a change of the inductor value, which results in the switching waveform (i.e. in the senses voltage 501) being modulated. This is illustrated in FIG. 5b which shows the basic switching waveform of a DC-DC converter 222. The inductor value has been modulated at a frequency which is lower than the converter switching frequency, i.e. lower than the commutation cycle rate of the power switch 212 of the converter 222.

In the illustrated example, the switching waveform 510 is amplitude modulated with two possible amplitude values (a high amplitude value 511 and a low amplitude value 512). The high amplitude value 511 may be achieved using a low inductor value and the low amplitude value 512 may be achieved using a high inductor value. The sequence of high/low amplitude values 511, 512 over time may be used transmit data to the controller 206, which may be configured to detect the sequence of high/low amplitude values 511, 512 at the sensing pin 216. As such, in the illustrated example, one bit of data may be transmitted per commutation cycle. Assuming a typically commutation cycle rate of 100 kHz, this modulation scheme allows for a data rate of 100 kbits/s. It should be noted that more than two amplitude values 511, 512 may be used, thereby increasing the number of bits which may be encoded into the modulation of the switching waveform 510, i.e. thereby increasing the data rate.

Figure 5C:
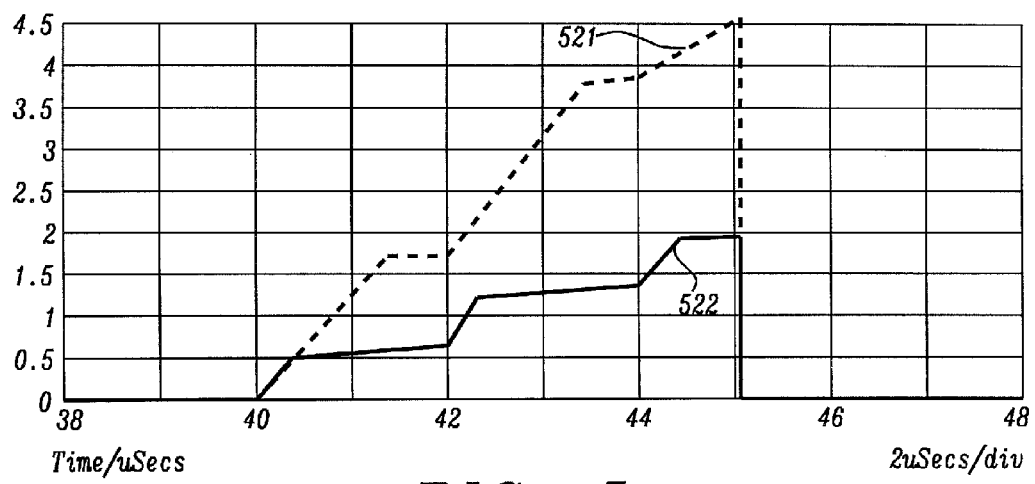

The modulation of the inductor value, and by consequence, the modulation of the switching waveform 510 may also be performed at frequencies which are higher than the switching frequency of the power switch 212. This is illustrated in FIG. 5c. In the illustrated example, the inductor value is modified at a rate which is higher than the switching frequency of the power switch 212. By way of example, an inductor value may be periodically increased/decreased at a certain duty cycle. The pattern of the periodic increase/decrease of the inductor value may be identified by the stepwise ramp-up 521, 522 of the sensed voltage 501. In particular, the length of the duty cycle of the periodic increase/decrease translates into a different slew rate for the ramp-up 521, 522 of the sensed voltage 501. In the illustrated example, the duty cycle for the periodic increase/decrease of the inductor value is lower for the ramp-up 521 than for the ramp-up 522 (thereby yielding a lower peak current at the end of the on-time of the power switch 212). The duty cycle is indicative of the time period of a high inductor value compared to the time period of a complete cycle of the periodic increase/decrease (being the sum of the time period of the low inductor value and the time period of the high inductor value).

Hence, the inductor value of one or more inductor elements 207 of the power converter 222 may be modulated (e.g. amplitude modulated and/or frequency modulated). The modulation of the inductor value may be achieved using an electro-magnet. The modulation of the inductor value impacts the current through the power switch 212 of the power converter 222. The current through the power switch 212 (e.g. the peak current and/or the ramp-up of the current) may be measured at the sensing pin 216 of the controller 206. Hence, by modulating the inductor value of one or more inductor elements 207 of the power converter 222, data may be communicated from an electro-magnet (external to the power converter 222) to the controller 206.

The inductor value typically depends on the winding and the inductor core material (which is typically a ferrite). The inductor core material typically leads to an increased inductor value L, until a magnetic flux in the inductor core material goes into saturation. As a result of saturation, the permeability of the inductor core material reduces. In the extreme saturation case, the inductor value tends to the inductor value of an air coil (this is dependent on the ferrite material and/or on the strength of saturation). Using an external magnet (e.g. an electro-magnet and/or a permanent magnet) the inductor core material can be provided with a preset magnetic flux and by adding an additional flux due to the coil current, the inductor core material may go into saturation at an earlier time instant (depending on the polarity of the external magnetization and the coil magnetization) compared to the situation, where the inductor core material has not been provided with a preset magnetic flux.

The inductor value L of a coil depends on the permeability $\mu_r$ of the inductor core material. Under certain conditions, the inductor value L is described by the equation $L=N^2 \times \mu_r \times \mu_o \times A/l$, wherein N is the number of windings of the coil, $\mu_o$ is the magnetic constant, A is the cross-section area of the coil and /is the length of the coil. The permeability $\mu_r$ of inductor core materials (notably of ferromagnetic materials) is not constant, but depends on the current through the coil. In saturable inductor core materials the relative permeability $\mu_r$ increases with increasing current to a maximum, but as the core material reaches saturation the relative permeability $\mu_r$ decreases toward one. As a consequence, the inductor value L depends on whether the inductor core material is saturated or not.

Figure 3A:
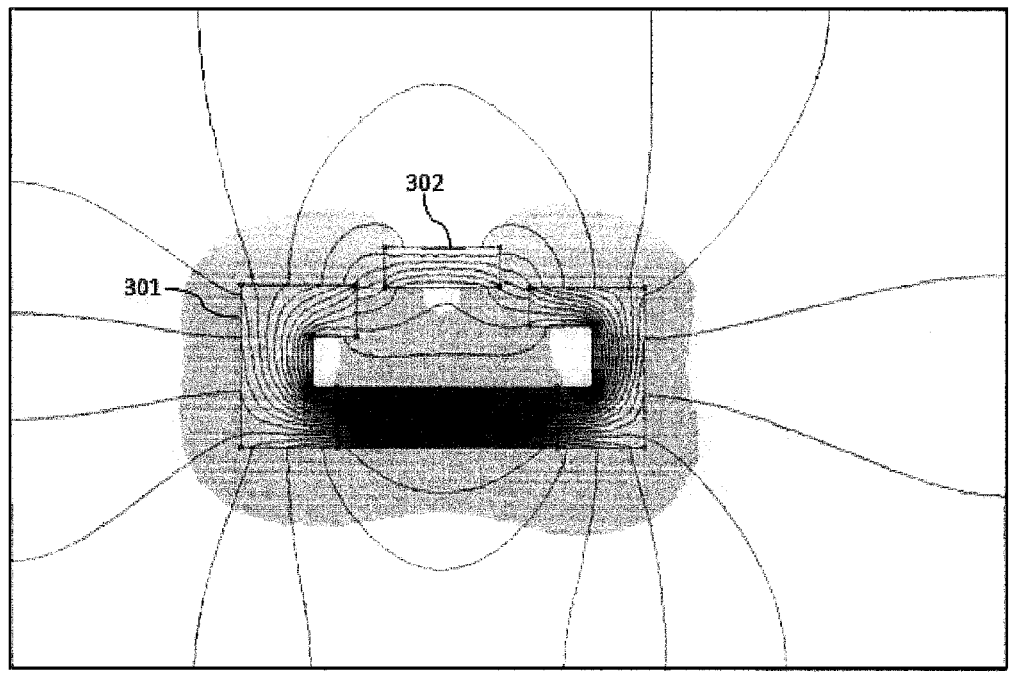
FIG. 3a illustrates an example magnetic field generated by an electro-magnet.

Using the external magnet, the inductor core material may be pre-magnetized, thereby moving the saturation point. In particular, the pre-magnetization of the inductor core material may be used to modify the relative permeability $\mu_r$ of the inductor core material, thereby modifying the inductor value L of the one or more inductor elements 207 of the power converter 222. The pre-magnetization of an inductor element 207 using an external magnet is illustrated in FIG. 3a. It can be seen that the external magnet 301 generates a magnetic field within the core material 302 of the inductor element 207. This magnetic field pre-magnetizes the inductor core material 302 of the inductor element 207.

Figure 3B:
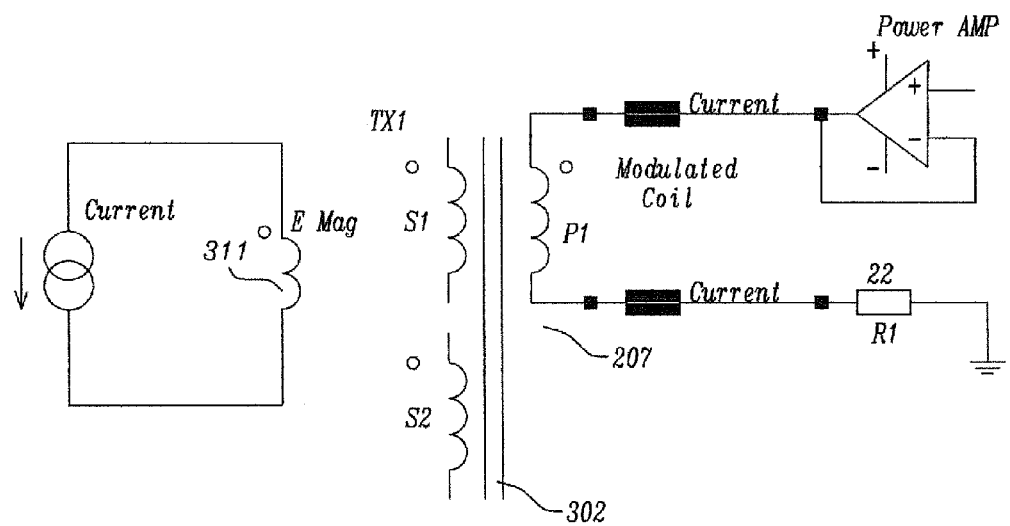
FIG. 3b shows a block diagram of an example setup for measuring the magnetic coupling between an electro-magnet and a transformer of a power converter.

FIG. 3b illustrates an example setup for modulating the inductor element 207 of a power converter 222. FIG. 3b shows an electro-magnet TX1 311 which is magnetically coupled with the inductor core material 302 of the inductor element 207 (e.g. the transformer 207 of the fly-back converter 222 of FIG. 2). Transformer TX1 207 comprises a primary winding P1 a first secondary winding S1 and a second secondary winding S2. A pre-determined alternating voltage may be applied to the inductor element 207.

Figure 4A:
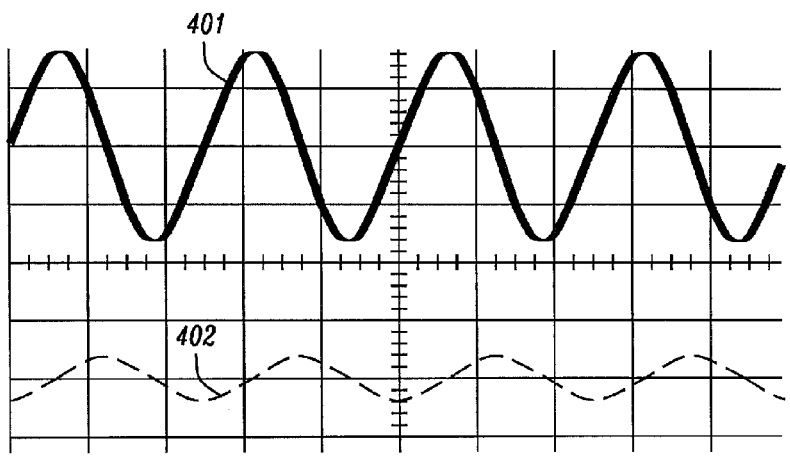
FIGS. 4a to 4f show example measurement results.
Figure 4B:
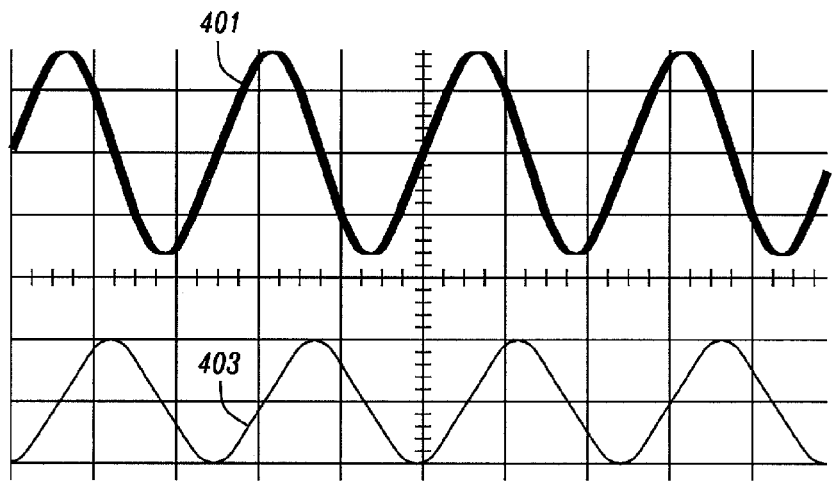

Furthermore, a current through the inductor element 207 may be measured depending on whether the electro-magnet 311 is turned on or not. As can be seen in FIGS. 4a and 4b, the alternating voltage 401 at the inductor element 207 induces an alternating current 402, 403 through the inductor element 207. By turning on the electro-magnet 311, the inductor value L may be reduced (by putting the inductor core material 302 into saturation), thereby increasing the current 403 in the inductor element 207. FIG. 4a shows the inductor current 402, when the electro-magnet 311 is turned off and FIG. 4b shows the (increased) inductor current 403, when the electro-magnet 311 is turned on.

Figure 4C:
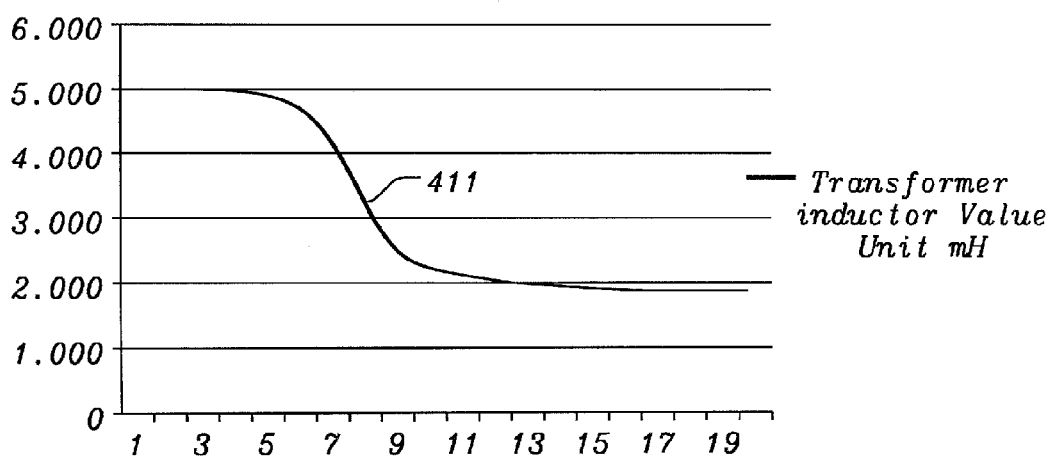
Figure 4D:
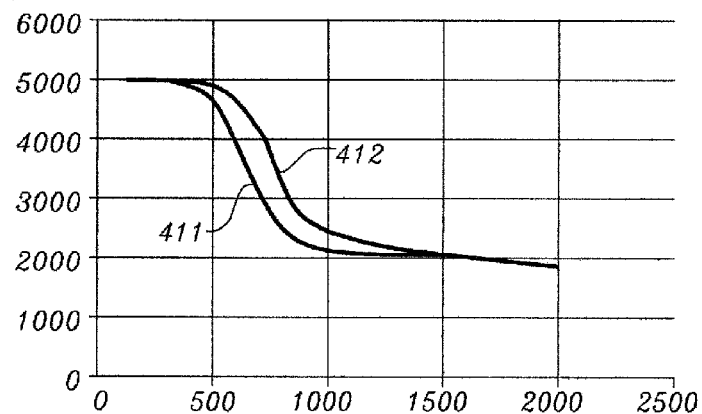

The impact of a current through the electro-magnet 311 (i.e. the impact of the strength of the magnetic field generated by the electro-magnet 311) is illustrated in FIGS. 4c and 4d. It can be seen that by increasing the current through the electro-magnet 311 (also referred to as the coil current of the electro-magnet 311), the inductor value is reduced (reference numeral 411). Furthermore, the hysteresis effect can be seen in FIG. 4d. It can be seen that the evolution of the inductor value is different, when decreasing the current through the electro-magnet 311 (reference numeral 412), compared to the evolution of the inductor value, when increasing the current through the electro-magnet 311 (reference numeral 411). The hysteresis effect impacts the value of the inductor value. In order to avoid ambiguities caused by the hysteresis effect, the amplitude used for amplitude modulation of the inductor value may therefore be selected to be at or above a pre-determined minimum amplitude value.

Figure 3C:
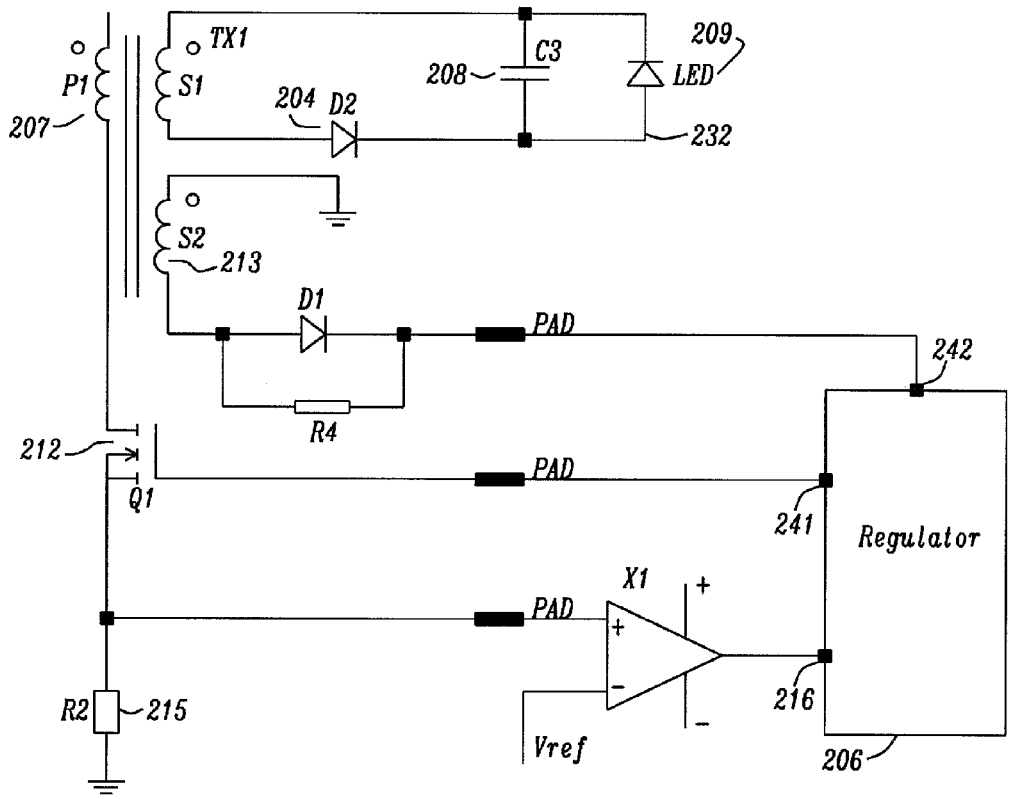
FIG. 3c shows a block diagram of an example power converter.

FIG. 3c shows an excerpt of the driver circuit 200 of FIG. 2. In particular, FIG. 3c shows the components of the flyback converter 222 of FIG. 2. The controller 206 (also referred to as a regulator) is configured to measure free-wheeling of the auxiliary winding 213 of the transformer 207 via a sensing pin 242. The control signal (i.e. the gate voltage) for the power switch 212 may be provided via a control pin 241. Transformer TX1 207 comprises a primary winding P1 a first secondary winding S1 and a second secondary winding S2.

FIGS. 4e and 4f show example measurement signals for the circuit of FIG. 3c. The measurement signals may be received by the controller 206 via the sensing pin 242 and/or via the sensing pin 216. In the scenario of FIG. 4e, no current is provided to the electro-magnet 311, i.e. in the scenario of FIG. 4e, the inductor value of the transformer 207 is relatively high. On the other hand, in the scenario of FIG. 4f, a current is provided to the electro-magnet 311, i.e. in the scenario of FIG. 4f, the inductor value of the transformer 207 is relatively low (as the inductor core material of the transformer 207 may be saturated).

FIGS. 4e and 4f show the gate control signal 421 provided at the control pin 241 of the controller 206. The gate control signal 421 causes the power switch 212 to switch between on-state and off-state, respectively. Furthermore, FIGS. 4e and 4f show the drive current 232, 422 to the SSL device 209. It can be seen that the drive current 232, 422 is substantially the same for the two scenarios of FIGS. 4e and 4f. In other words, it can be seen that the drive current 232 to the SSL device is substantially unaffected by the inductor value of the transformer 207.

Furthermore, FIGS. 4e and 4f show the free-wheeling 423, 426 of the auxiliary winding 213 sensed at the sensing pin 242. As such, the measurement signal may be indicative of free-wheeling. In particular, FIGS. 4e and 4f illustrate the different free-wheeling times 427, 428 for the different scenarios of FIGS. 4e and 4f. It can be observed that the free-wheeling times 427, 428 increase with decreasing inductor value. The free-wheeling times 427, 428 may be determined by the controller 206 based on the free-wheeling signals 423, 426 sensed at the sensing pin 242. As such, the measurement signal may be indicative of the free-wheeling times 427, 428. Hence, a modulation of the inductor value of the transformer 207 using an electro-magnet 311 may be used to transmit information from an external unit to the driver circuit 200.

In addition, FIGS. 4e and 4f show the current 424, 425 through the power switch 212, measured as a voltage at the sensing pin 216. It can be seen that in the scenario of FIG. 4e, the peak of the current 424 is lower than the peak of the current 425 in the scenario of FIG. 4f. This is due to the different inductor values of the transformer 207 for the two scenarios. As outlined above, these different peak currents may be detected by the controller 206, based on the current signals sensed at the sensing pin 216 (which correspond to the voltage drop at the shunt resistor 215). Hence, a modulation of the inductor value of the transformer 207 using an electro-magnet 311 may be used to transmit information from an external unit to the driver circuit 200.

Consequently, an electro-magnet 311 may be used to modulate the inductor value of an inductor element 207 of the power converter 222. By using an electro-magnet 311, carrier frequencies for data communication of up to several 10 MHz may be achieved, thereby enabling relatively high data-rates for the communication towards the driver circuit 200. In other words, the inductor value may be modified at relatively high rates (e.g. in the range of 10 MHz). The impact of the periodically modified inductor value may be sensed at the controller 206, thereby enabling relatively high data rates.

The electro-magnet 311 may be configured to generate a carrier frequency which corresponds to (e.g. which is the same frequency as) the switching frequency of the DC-DC converter 222. In other words, the inductor value may be modified at the same rate as the commutation cycle rate of the converter 222. Alternatively, higher or lower frequencies may be used as a carrier frequency (as illustrated in FIGS. 5b and 5c). When using a higher modulation frequency than the switching frequency of the power converter 222, the slew rate of the current through power switch 212 (i.e. the current through the inductor element 207) may be modulated (as illustrated in FIG. 5c). The modulated slew rate may be detected by the controller 206.

Various modulation schemes may be implemented, e.g. amplitude modulation and/or frequency modulation. In particular, the inductor value may be amplitude modulated. A particularly robust modulation scheme is an amplitude modulation of a carrier signal, with the carrier frequency being lower than or equal to the switching frequency of the power converter 222 (as illustrated e.g. in FIG. 5b).

The degree of saturation of the inductor core material 302 may be controlled by the air gap between the electro-magnet 311 and the inductor core material 302. Furthermore, the physical form factor of the electro-magnet 311 may impact the degree of saturation of the inductor core material 302.

The electro-magnet 311 may be viewed as an additional winding of the converter inductor 207. As such, the electro-magnet 311 may be viewed as a sensing coil. The magnetic coupling between the inductor element 207 of the power converter 222 and the electro-magnet 311 may be used for providing a communication link from the light bulb assembly 1 to an external receiver. In particular, the controller 206 may be configured to modulate the current through the inductor element 207 of the power converter 222. The modulated current through the inductor element 207 induces a modulation of the magnetic field within the inductor core material. The modulated magnetic field may be coupled to the electro-magnet 311. At the electro-magnet 311, the modulated magnetic field may induce a modulated coil current which can be detected by an appropriate receiver at the electro-magnet 311.

Hence, the electro-magnet 311 and the inductor element 207 may be used to provide a bi-directional communication link. Alternatively or in addition, the reverse communication path from the light bulb assembly 1 to an external receiver may be provided by a modulation of the light emitted by the light bulb assembly 1 and/or by modifying the switching converter frequency (which may be detected by an external antenna).

It should be noted that the polarity of the magnet 311 may be arbitrary, notably if the magnetic field generated by the magnet 311 puts the inductor core material 302 into saturation. This is beneficial, as it simplifies the setup of the magnetic coupling between the magnet 311 and the inductor element 207 of the driver circuit 200. In particular, this may be beneficial for providing a fast and cost effective calibration process of a light bulb assembly 1, as the light bulb assembly 1 may be placed in an arbitrary manner relative of the electro-magnet 311. This is illustrated in FIG. 1, where the light bulb assembly 1 is shown in conjunction with the electro-magnet 311. Due to the indifference with regards to polarity, the light bulb assembly 1 may be turned in any way around its longitudinal axis.

In order to increase the dynamics of the communication system, the inductor value of the inductor of an electro-magnet 311 may be reduced (e.g. by splitting the coil of the electro-magnet 311 into a plurality of segments (e.g. 10 segments). In particular, the coil of the electro-magnet 311 may be subdivided into a plurality of segments, thereby reducing the number N of windings for each segment (while keeping the total number of windings constant). The plurality of segments may be operated in parallel. As a result of this, the same magnetic field strength may be generated (as for the electromagnet 311 using a single coil), while at the same time, significantly reducing the inductance L of the overall coil (comprising a plurality of segments). As a result, the modulation speed of the magnetic field may be increased, thereby increasing the possible communication speed on the communication path between the magnet 311 and the power converter 222. Furthermore, a current source may be used for modulation of the coil current.

FIG. 5a illustrates how the peak current (using constant on-time duration 504) is modified subject to a modification of the inductor value. Alternatively, the power switch 212 may be controlled based on a pre-determined peak current. As a result of this, the modification of the inductor value impacts the on-time duration 504. The modification of the on-time duration 504 can be detected by the controller 206, thereby providing a communication path towards the controller 206 of the driver circuit 200.

Figure 6:
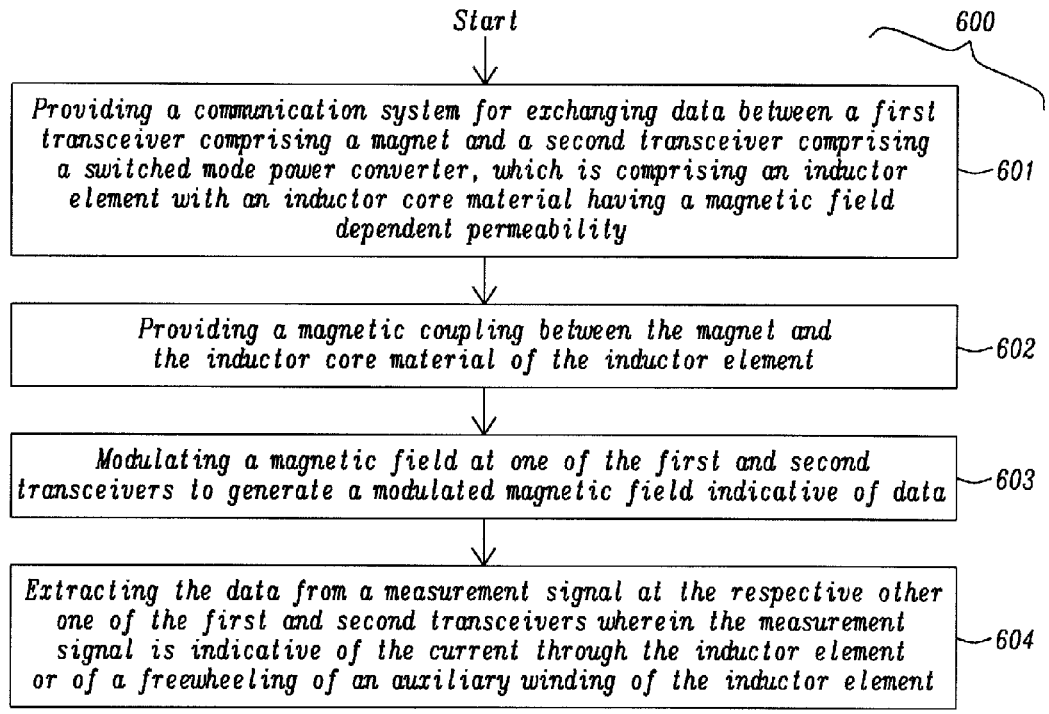
FIG. 6 shows a flow chart of an example method for exchanging data with a power converter.

FIG. 6 shows a flow chart of an example method 600 for exchanging data between a first transceiver (i.e. transmitter/receiver) comprising the magnet 311 and a second transceiver comprising the switched-mode power converter 222. As outlined above, the power converter 222 comprises an inductor element 207 with an inductor core material 302 having a magnetic field dependent permeability. In step 601 the method 600 describes providing a communication system for exchanging data between a first transceiver comprising a magnet and a second transceiver comprising a switched-mode power converter, which is comprising an inductor element with an inductor core material having a magnetic field dependent permeability and in step 602 the method 600 illustrates providing a magnetic coupling between the magnet 311 and the inductor core material 302 of the inductor element 207. Furthermore, in step 603 the method 600 illustrates modulating a magnetic field at one of the first and second transceivers to generate a modulated magnetic field indicative of data. In addition, the method 600 depicts in step 604 extracting the data from a measurement signal 423, 424 at the respective other one of the first and second transceivers. The measurement signal 423, 424 may be dependent on the modulated magnetic field. In particular, the measurement signal 423, 424 may be indicative of the current through the inductor element or of a freewheeling of an auxiliary winding of the inductor element.

Figure 7:
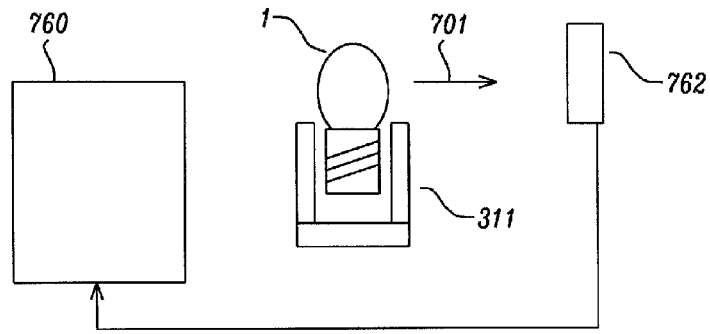
FIG. 7 shows an example setup for the calibration of a light bulb assembly.

FIG. 7 illustrates an example setup for a calibration for a light bulb assembly 1. The setup comprises a programming unit 760 which is coupled to the light bulb assembly 1 using an electro-magnet 311. The programming unit 760 may be configured to supply a modulated electrical signal to the electro-magnet 311. The modulated electrical signal, i.e. the modulated coil current, may induce a corresponding modulated magnetic field which is magnetically coupled to the one or more inductor elements 207 of the driver circuit 200, 8 of the light bulb assembly 1. As such, data may be provided from the programming unit 760 to the controller 206 of the driver circuit 200. The data provided to the controller 206 may impact the operational state of the driver circuit 200.

A sensor unit 762 is provided for detecting light 701 output from the light bulb assembly 1. The sensor unit 762 generates a sensor signal indicative of a desired parameter or parameters of the light signal output from the light bulb assembly 1. The sensor signal is supplied to the programming unit 760 which generates a differently modulated electrical signal on the basis of the sensor signal and on the basis of stored information (e.g. regarding the behavior/characteristics of the light bulb assembly 1). The differently modulated electrical signal may be transmitted via the magnet 311 to the light bulb assembly 1, and may then cause control data items to be stored in a data storage unit of the controller 206. The control data items may then be used to control the light 701 output from the light bulb assembly 1.

Figure 8:
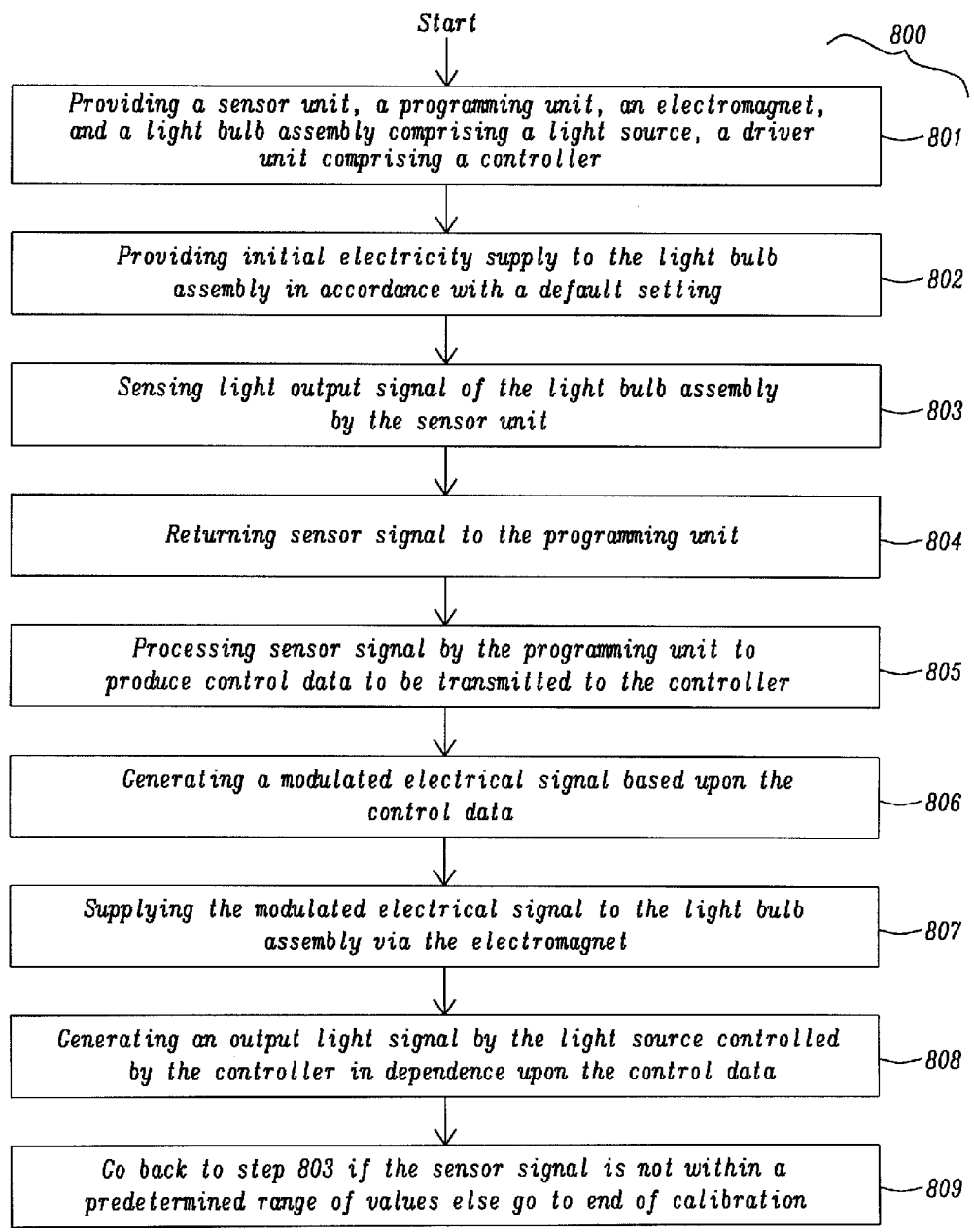
FIG. 8 shows a flow chart of an example method for calibrating a light bulb assembly.

FIG. 8 shows steps of a method 800 for calibrating a light bulb assembly 1. Step 801 illustrates providing a sensor unit 762, a programming unit 760, an electromagnet 311, and a light bulb assembly 1 comprising a light source 209, a driver unit 200 comprising a controller 206. Step 802 illustrates depicts that electricity is supplied to the light bulb assembly 1 to cause the light source 209 of the light bulb assembly 1 to output a light signal 701 in accordance with an initial default setting. Step 803 shows that the output light signal 701 is sensed by the sensor unit 762, and in step 804 a sensor signal is returned to the programming unit 760. In step 805 the programming unit 760 processes the sensor signal in accordance with a predetermined algorithm or method to produce control data to be transmitted to the controller 206 of the driver circuit 200 of the light bulb assembly 1. In step 806 a modulated electrical signal (in particular a modulated coil current) is generated on the basis of the control data, and is then supplied in step 807 to the light bulb assembly 1 via the electro-magnet 311.

In step 808 the controller 206 may then operate to control the light source 209 of the light bulb assembly 1 in dependence upon the updated control data, thereby causing the light source 209 to generate in step 808 an adjusted output light signal 701. This adjusted light signal 701 may then be sensed in step 803 by the sensor unit 762 for continuing the programming process until the sensor signal is within a predetermined range of values, i.e. until the light 701 emitted by the light source 209 meet pre-determined requirements.

As such, the light bulb assembly 1 (e.g. the intensity of the emitted light 701 and/or the color of the emitted light 701 may be calibrated). In other words, the output light 701 generated by the light source 209 of the light bulb assembly 1 may be calibrated to meet a required specification. For example, the output light 701 may be adjusted such that its intensity and/or spectrum meet desired characteristics. Such output specifications may be determined by the manufacturer of the light bulb assembly 1, or may be determined by an application to which the light bulb assembly 1 is to be put. For example, one application may require a high intensity light having a mainly blue spectrum, whilst another application may require low intensity, mainly red light to be generated by the light source. Both applications can be catered for by the use of a programmable controller 206 within the driver circuit 200 of the light bulb assembly 1.

As indicated above, the light signal 701 output by the light source 209 may itself be a data-carrying signal, which uses a modulated light output signal. The modulated light signal may be generated using any suitable modulation scheme, including, but not limited to, an amplitude or frequency modulation scheme. The modulated light signal 701 may be used to output system status information relating to the LED 209 and other components of the assembly 1 for use by the programming unit 760.

Alternatively or in addition, the reverse communication path from the light bulb assembly 1 to the programming unit 760 may be established via the magnetic coupling between the inductor elements 207 of the light bulb assembly 1 and the electro-magnet 311 (as outlined above).

In the present document, a method and a system for providing a communication link towards and from a driver circuit for a light bulb assembly have been described. The method and system make use of an external magnet, as well as an internal inductor element of the driver circuit. The method and system enable relatively high data-rates. The common metal assembly components (such as copper, aluminium, and brass) of a light bulb assembly are neutral to the magnetic coupling of the external magnet and the internal inductor element. Furthermore, the method and system enable the measurement of the limit of the inductor core material (in particular saturation of the inductor core material).

The methods and systems have been described in the context of a light bulb assembly, and in particular in the context of calibration of a light bulb assembly. It should be noted that the methods and systems may be used in various other applications such as in general power supplies (main plugs) or in mobile applications to avoid any needle connections. By way of example, the method and system may be used to provide a bi-directional communication path between the power converter comprised within a mobile electronic device (e.g. a smartphone or a tablet PC) and an external unit.

Furthermore, the method and system may be used as a special test for inductor modulation, e.g. to test saturation limits. By way of example, using the magnet 311, the inductor core material 302 of the inductor element 207 of the power converter 222 may be preset to a pre-determined value. The presetting of the inductor core material 302 may be used to test the margin for saturation of the inductor element 207. As such, a test system configured to test a saturation margin of an inductor element is described. The test system may comprise a test unit comprising a magnet 311. The test system may be configured to test the inductor element 207 (e.g. of a switched-mode power converter). The inductor element 207 may comprise an inductor core material 302 having a magnetic field dependent permeability. The magnet 311 and the inductor core material 302 of the inductor element 207 may be magnetically coupled.

The magnet 311 may be configured to generate a magnetic field to preset the inductor core material 302 at a pre-determined operating point. In particular, the magnet 311 may be configured to generate a plurality of magnetic fields at a plurality of different magnetic field strengths. As such, the inductor core material 302 may be preset at a corresponding plurality of different operating points.

The controller 206 of the power converter 222 may be configured to determine the inductor value of the inductor element 207 (e.g. based on the steepness of the current ramp 502, 503). In particular, the controller 206 may be configured to detect that the inductor core material 302 of the inductor element 207 goes into saturation (e.g. due to a drop of the inductor value). Furthermore, the controller 206 may be configured to inform the test unit that a saturation situation has been detected (e.g. using the communication scheme described in the present document).

Hence, the test system may be configured to determine the magnetic field strength from the plurality of magnetic field strengths, starting from which the inductor core material 302 goes into saturation (under typical operating conditions of the power converter 222). Consequently, the saturation margin of the inductor element 207 may be determined.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A communication system comprising
a first transceiver comprising a magnet; and
a second transceiver comprising a switched-mode power converter which comprises a power switch and an inductor element with an inductor core material having a magnetic field dependent permeability, such that an inductor value of the inductor element depends on a strength of the magnetic field at the inductor core material, the power switch controlled to commutate between an on-state and an off-state at a commutation cycle rate; wherein the magnet and the inductor core material of the inductor element are magnetically coupled; wherein
the first transceiver is configured to modulate a magnetic field generated by the magnet, to generate a modulated downstream magnetic field indicative of downstream data, the downstream data comprising data for modifying an operational mode of the power converter; and wherein the second transceiver is configured to extract the downstream data from a measurement signal from the power converter; wherein the measurement signal is dependent on the inductor value of the inductor element.

2. The system of claim 1, wherein the magnet
comprises an electro-magnet;
the electro-magnet comprise a magnet core material and a coil;
the magnet core material is magnetically coupled with the inductor core material;
the electro-magnet is configured to generate the modulated downstream magnetic field by varying a coil current of the electro-magnet; and/or to extract the upstream data from the coil current, which has been modulated in accordance to the modulated upstream magnetic field.

3. The system of claim 1, wherein the second transceiver comprises a controller configured to
receive the measurement signal via a sensing pin of the controller; and
provide a control signal to a power switch of the power converter via a control pin of the controller, such that the power switch commutates between an on-state and an off-state at a commutation cycle rate.

4. The system of claim 1, wherein
the power converter comprises one or more of: a buck converter, a flyback converter, a boost converter, a buck-boost converter, a SEPIC converter; and/or
the inductor element comprises one or more coils.

5. The system of claim 1, wherein the measurement signal is indicative of one or more of
a current through a power switch of the power converter;
a current through a coil of the inductor element; and
free-wheeling of an auxiliary coil of the inductor element.

6. The system of claim 1, wherein
an amplitude of the magnetic field is modulated; and/or
a frequency of a modification of the magnetic field is modulated.

7. The system of claim 6, wherein the modulated downstream magnetic field comprises a high state subject to which the inductor core material is saturated and a low state subject to which the inductor core material is not saturated.

8. The system of claim 6, wherein the frequency of the modifications of the magnetic field is higher than a commutation cycle rate of a power switch of the power converter.

9. The system of claim 1, wherein the second transceiver is further configured to modulate a magnetic field generated by the inductor element, to generate a modulated upstream magnetic field indicative of upstream data, and wherein the first transceiver is further configured to extract the upstream data from the modulated upstream magnetic field.

10. A controller for a switched-mode power converter; wherein the switched-mode power converter comprises a power switch and an inductor element with an inductor core material having a magnetic field dependent permeability, such that an inductor value of the inductor element depends on a strength of the magnetic field at the inductor core material, the power switch controlled to commutate between an on-state and an off-state at a commutation cycle rate; the controller being configured to
receive a measurement signal from the power converter; wherein the measurement signal is dependent on the inductor value of the inductor element; wherein the inductor value has been modulated to be indicative of downstream data, wherein the downstream data comprises data for modifying an operational mode of the power converter; and
extract the downstream data from the measurement signal.

11. A driver circuit configured to provide, at an output of the driver circuit, electrical energy at a drive voltage, derived from electrical energy at an input voltage at an input of the driver circuit, the driver circuit comprising
a switched-mode power converter configured to convert the electrical energy at the input voltage into the electrical energy at the drive voltage; wherein the switched-mode power converter comprises an inductor element with an inductor core material having a magnetic field dependent permeability; and
a controller for the switched-mode power converter, wherein the switched-mode power converter comprises a power switch and an inductor element with an inductor core material having a magnetic field dependent permeability, such that an inductor value of the inductor element depends on a strength of the magnetic field at the inductor core material, the power switch controlled to commutate between an on-state and an off-state at a commutation cycle rate; wherein the controller is configured to:
receive a measurement signal from the power converter; wherein the measurement signal is dependent on the inductor value of the inductor element; wherein the inductor value has been modulated to be indicative of downstream data, wherein the downstream data comprises data for modifying an operational mode of the power converter; and
extract the downstream data from the measurement signal.

12. A light bulb assembly comprising
an electrical connection module configured to electrically connect to a mains power supply, thereby providing electrical energy at the input voltage;
a driver circuit, configured to provide electrical energy at the drive voltage from the electrical energy at the input voltage, comprising: a switched-mode power converter configured to convert the electrical energy at the input voltage into the electrical energy at the drive voltage; and a controller for the switched-mode power converter, wherein the switched-mode power converter comprises a power switch and an inductor element with an inductor core material having a magnetic field dependent permeability, such that an inductor value of the inductor element depends on a strength of the magnetic field at the inductor core material, the power switch controlled to commutate between an on-state and an off-state at a commutation cycle rate;
wherein the controller is configured to: receive a measurement signal from the power converter; wherein the measurement signal is dependent on the inductor value of the inductor element; wherein the inductor value has been modulated to be indicative of downstream data, wherein the downstream data comprises data for modifying an operational mode of the power converter; and extract the downstream data from the measurement signal; and
a light source configured to provide light using the electrical energy at the drive voltage.

13. A method for exchanging data between a first transceiver comprising a magnet and a second transceiver comprising a switched-mode power converter which comprises a power switch and an inductor element with an inductor core material having a magnetic field dependent permeability, such that an inductor value of the inductor element depends on a strength of the magnetic field at the inductor core material, the power switch controlled to commutate between an on-state and an off-state at a commutation cycle rate; the method comprising
providing a magnetic coupling between the magnet and the inductor core material of the inductor element;
modulating a magnetic field at the first transceiver, to generate a modulated magnetic field indicative of downstream data; wherein the downstream data comprises data for modifying an operational mode of the power converter; and
extracting the downstream data from a measurement signal at the second transceiver; wherein the measurement signal is dependent on the inductor value of the inductor element.

14. A calibration system configured to calibrate a light bulb assembly comprising: an electrical connection module configured to electrically connect to a mains power supply, thereby providing electrical energy at the input voltage; a light source configured to provide light using the electrical energy at the drive voltage; and a driver circuit, configured to provide electrical energy at the drive voltage from the electrical energy at the input voltage the driver circuit comprising: a switched-mode power converter configured to convert the electrical energy at the input voltage into the electrical energy at the drive voltage; wherein the switched-mode power converter comprises an inductor element with an inductor core material having a magnetic field dependent permeability; and a controller for the power converter, wherein the switched-mode power converter comprises a power switch and an inductor element with an inductor core material having a magnetic field dependent permeability, such that an inductor value of the inductor element depends on a strength of the magnetic field at the inductor core material, the power switch controlled to commutate between an on-state and an off-state at a commutation cycle rate;
wherein the controller is configured to: receive a measurement signal from the power converter; wherein the measurement signal is dependent on the inductor value of the inductor element; wherein the inductor value has been modulated to be indicative of downstream data, wherein the downstream data comprises data for modifying an operational mode of the power converter; and extract the downstream data from the measurement signal;
the calibration system comprising:

a magnet configured to generate a magnetic field; wherein the magnet is arranged to be magnetically coupled with an inductor element comprised within the light bulb assembly;

a programming unit configured to
determine control data for modifying an operating state of a controller comprised within the light bulb assembly; and
cause the magnet to generate a modulated magnetic field indicative of the control data; and a sensor unit configured to capture light emitted by the light bulb assembly; wherein the programming unit is configured to determine the control data based on the captured light.

15. A method for calibrating a light bulb assembly comprising: providing an electrical connection module configured to electrically connect to a mains power supply, thereby providing electrical energy at the input voltage; a light source configured to provide light using the electrical energy at the drive voltage; and a driver circuit, configured to provide electrical energy at the drive voltage from the electrical energy at the input voltage the driver circuit comprising: a switched-mode power converter configured to convert the electrical energy at the input voltage into the electrical energy at the drive voltage; wherein the switched-mode power converter comprises a power switch and an inductor element with an inductor core material having a magnetic field dependent permeability; and a controller for the power converter, wherein the controller is configured to: receive a measurement signal from the power converter; wherein the measurement signal is dependent on the inductor value of the inductor element; wherein the inductor value has been modulated to be indicative of downstream data, wherein the downstream data comprises data for modifying an operational mode of the power converter; and extract the downstream data from the measurement signal; the method comprising establish a communication path from a magnet to an inductor element comprised within the light bulb assembly, by magnetically coupling the magnet and the inductor element;

determining control data for modifying an operating state of a controller comprised within the light bulb assembly;

causing the magnet to generate a modulated magnetic field indicative of the control data; and capturing light emitted by the light bulb assembly; wherein the control data is determined based on the captured light.

16. A method for calibrating a light bulb assembly comprising the steps of:
(1) providing a sensor unit, a programming unit, an electromagnet, and a light bulb assembly comprising a light source, a driver unit comprising a controller and a driver circuit, configured to provide electrical energy at the drive voltage from the electrical energy at the input voltage, the driver circuit comprising: a switched-mode power converter configured to convert the electrical energy at the input voltage into the electrical energy at the drive voltage; wherein the switched-mode power converter comprises a power switch and an inductor element with an inductor core material having a magnetic field dependent permeability, such that an inductor value of the inductor element depends on a strength of the magnetic field at the inductor core material, and a controller for the power converter, the power switch controlled to commutate between an on-state and an off-state at a commutation cycle rate;

(2) providing initial electricity supply to the light bulb assembly in accordance with a default setting;
(3) sensing light output signal of the light bulb assembly by the sensor unit;
(4) returning sensor signal to the programming unit;
(5) processing sensor signal by the programming unit to produce control data to be transmitted to the controller;
(6) generating a modulated electrical signal based upon the control data;
(7) supplying the modulated electrical signal to the light bulb assembly via the electromagnet;
(8) generating an output light signal by the light source controlled by the controller in dependence upon the control data; and
(9) going back to step (3) if the sensor signal is not within a predetermined range of values else go to end of calibration.

17. The method of claim 16 wherein the programming unit processes the sensor signal in accordance with a predetermined algorithm or method to produce control data.

18. The method of claim 16 wherein the modulated electrical signal is a modulated coil current.

19. The method of claim 16 wherein the predetermined range of values comprises light intensity and/or spectrum of light.

20. The method of claim 16 wherein the output light signal is itself a data-carrying signal, which uses a modulated light output signal.

21. A method for exchanging data between a first transceiver and a second transceiver comprising the steps of:
providing a communication system for exchanging data between a first transceiver comprising a magnet and a second transceiver comprising a switched-mode power converter comprising a power switch and an inductor element, such that an inductor value of the inductor element depends on a strength of a magnetic field at an inductor core material of the inductor element, the power switch controlled to commutate between an on-state and an off-state at a commutation cycle rate;
providing a magnetic coupling between the magnet and the inductor core material of the inductor element;
modulating the magnetic field at the first transceiver to generate a modulated magnetic field indicative of downstream data, wherein the downstream data comprises data for modifying an operational mode of the power converter; and
extracting the downstream data from a measurement signal at the second transceiver wherein the measurement signal is dependent on the inductor value of the inductor element.

22. The method of claim 21 wherein the inductor element is provided with an inductor core material having a magnetic field dependent permeability.

23. The method of claim 21 wherein the measurement signal is indicative of the current through the inductor element or of a freewheeling of an auxiliary winding of the inductor element.

24. The method of claim 21 wherein an inductor value of the inductor of the magnet is reduced in order to increase the dynamics of the communication system.

25. The method of claim 24 wherein the inductor value of the inductor of the magnet is reduced by splitting a coil of the magnet into a plurality of segments.

26. The method of claim 25 wherein the number of windings for each segment is reduced while keeping the total number of windings constant wherein the plurality of segments is operated in parallel, hence a same magnetic field strength is generated as for the magnet using a single coil, while at the same time, the inductance L of the overall coil comprising a plurality of segments is reduced.

* * * * *